Nov. 24, 1953 — L. B. COLLINS ET AL — 2,660,458
SHAFT OR ROD PACKING
Filed Feb. 15, 1949 — 2 Sheets-Sheet 2
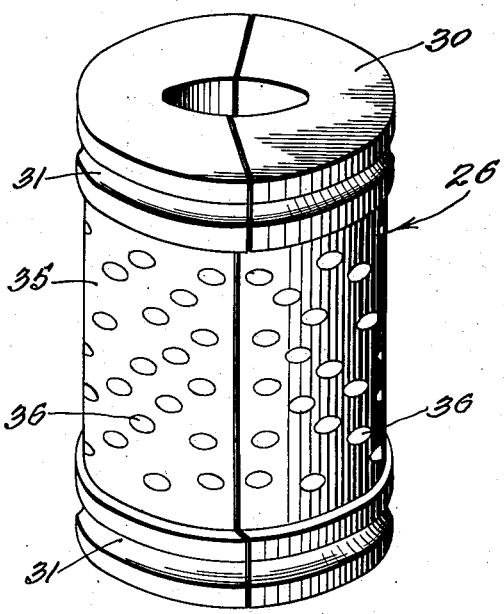
FIG. 5.
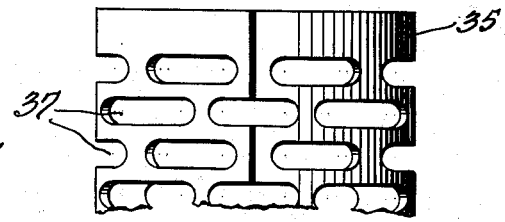
FIG. 6.
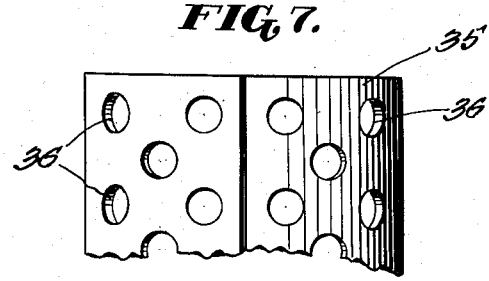
FIG. 7.
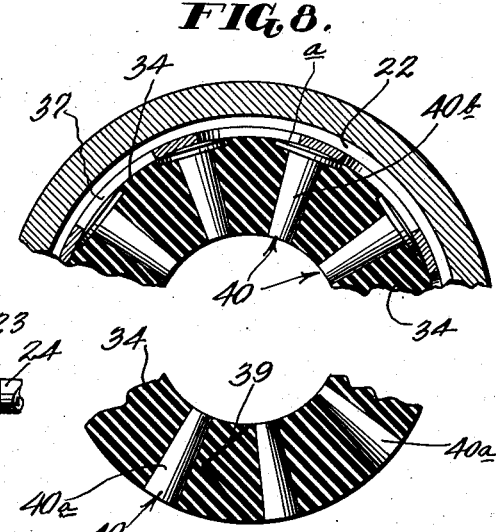
FIG. 8.
FIG. 9.
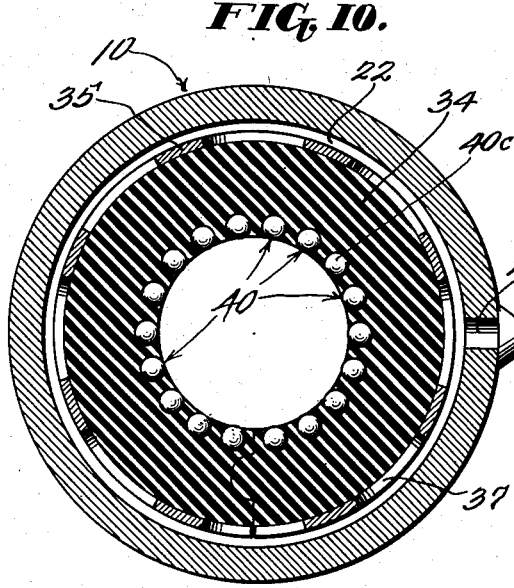
FIG. 10.
Inventors
Lawrence B. Collins
Clinton A. Langstaff
By Wilfred E. Lawson
ATTORNEY Patented Nov. 24, 1953

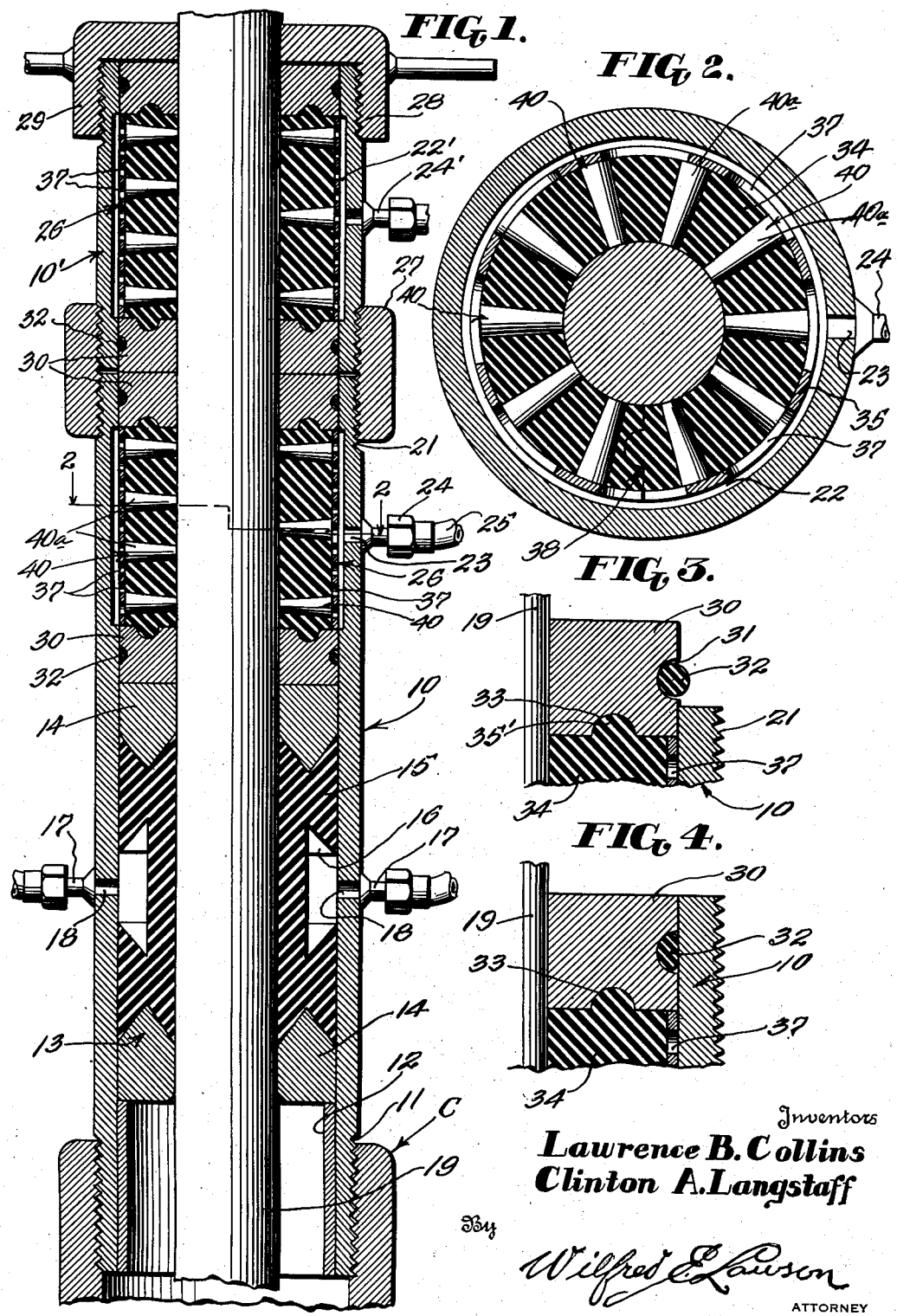

2,660,458

UNITED STATES PATENT OFFICE 2,660,458

SHAFT OR ROD PACKING

Lawrence B. Collins, Orange, and Clinton A. Langstaff, Compton, Calif.

Application February 15, 1949, Serial No. 76,612

1 Claim. (Cl. 286—16)

This invention relates generally to improvements in bushings or packing for rotary and/or reciprocating shafts and is directed particularly to improvements in bearing bushings for use around the polish rods or pump rods of wells, more particularly oil wells.

In the operation of oil wells, the well pump rods are sealed at the head of the well by means of an encircling bushing or packing which is compressed against the rod by the application of end pressure thereto. Such gland packings have a relatively short life and must, therefore, be frequently replaced during the operation of pumping the well.

The present invention has for its principal object to provide an improved packing gland or bushing which is designed and constructed in a novel manner so that it may be firmly pressed around the pump rod or the shaft, where it may be used with a rotating shaft rather than a reciprocating rod, and used over a long period of time without undue wear or without tearing out and losing the pressure from within the well.

Another object of the invention is to provide an improved sealing head for a well casing and a bushing or packing for the pump rod, wherein the head of the well is effectively sealed off and at the same time wear elements are constantly in contact with the rod which provide a smooth working contact with the rod whereby to prevent the yieldable packing material from being torn away.

Still another object of the invention is to provide a packing or gland bushing of the above described character wherein metallic elements constitute a part of the bushing and function to maintain the surface of the polish rod smooth and even whereby the desired smooth and firm contact of the yieldable sealing material is effectively maintained with the polish rod.

A still further object of the invention is to provide a gland packing or bushing of the character stated wherein novel means is employed for compressing the gland around the polish rod or shaft by the application of a suitable fluid or semi-fluid material around the outside of the bushing.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in longitudinal section of a portion of the upper end of a well casing showing therein a gland packing or bushing constructed in accordance with the present invention in association with a sealing bushing.

Figure 2 is a transverse section taken substantially on the line 2—2 of Figure 1, the same being on an enlarged scale.

Figure 3 is a detail section on an enlarged scale showing the compressible packing ring around the metal collar prior to insertion of the collar into the casing sleeve.

Figure 4 is a sectional view corresponding to Figure 3 but showing the compression of the sealing ring in the metal sleeve.

Figure 5 is a view in perspective of a bushing or gland unit constructed in accordance with the present invention.

Figure 6 is a view illustrating one form of metal sleeve which may be employed around the yieldable gland.

Figure 7 is a view in perspective of a portion of another form of the sleeve.

Figure 8 is a detail view on an enlarged scale illustrating the use of headed metal plugs in the packing.

Figure 9 is a detail section on an enlarged scale showing the use of straight tapered plugs in the packing.

Figure 10 is a sectional view corresponding to Figure 2 and showing the use of metal pellets embedded in the rubber packing.

Referring now more particularly to the drawings Figure 1 illustrates the application of the present invention to the top of a well tube or casing. This casing is conventionally illustrated and generally designated C.

The packing of the present invention in the several modifications constitutes an improvement upon the structure disclosed in our co-pending application Serial No. 784,236, filed November 5, 1947, now abandoned, of which this application is a continuation in part.

While reference has been made particularly to the use of the prevent invention in association with the pump rods or polish rods of oil wells, it is to be understood that the invention is not limited to such use since it has been found to be applicable to rotating shafts as well as reciprocating rods or shafts. It will be understood accordingly that even though the description may be confined to the use of the terms well rod or polish rod, there is no intention to limit the invention in this respect since it is equally applicable to rotary shafts such as are used in connection with pumps or other machines or to any other type of shaft either of a reciprocating or rotating nature.

In connection with the operation of wells use is commonly made of a shell or housing attached to the upper end of the well casing in which rubber packings or bushings are enclosed to encircle the polish rod and such packings or bushings are compressed around the polish rod by the application of pressure of some type either applied from the ends or around the middle of the bushing. In the present construction the encompassing pressure is applied around the outside of the bushing and also from the ends and the bushing unit is so constructed that the compressible element is completely enclosed within an apertured shell as distinguished from the compresser illustrated in our co-pending application above identified.

The present type of bushing is distinguished from those shown in the co-pending application in the novel manner in which the wear metal is carried by the compressible or yieldable portion of the bushing.

In accordance with the present invention there is provided the tubular bushing carrying housing 10, one end of which is threadably coupled with the casing as indicated at 11.

In the lower part of the housing a thimble 12 is fixed upon which rests a sealing bushing unit which is generally designated 13 and which comprises upper and lower rings 14 between which are held the split rubber sleeve 15 of the character defined in our co-pending application hereinbefore referred to.

The packing sleeve 15 is provided with the external encircling channel 16 and the wall of the housing has connected therewith the coupling nipples 17 which open through ports 18 into the channel 16 whereby fluid of a suitable nature may be introduced under high pressure into the channel 16 to compress the collar 15 around the polish rod 19 which passes through the housing and down through the casing C. This unit 13 is provided solely for the purpose of sealing off the upper end of the well casing when the overlying working bushings or glands must be removed for any purpose. Ordinarily the pressure in the unit 13 is reduced so that during the operation of the polish rod no material wear is caused upon the yieldable packing 15.

In carrying out the present invention the housing 10 above the temporary sealing unit 13 is screw threaded at its upper end as indicated at 21 and for a portion of its length just below the threaded part 21, the interior of the housing is reamed out as indicated at 22 to provide a fluid receiving area around the packing unit about to be described. This area 22 is provided with a sealing fluid by way of the port 23 and the nipple 24 with which a suitable line 25 is connected.

In the practical application of the present invention at least two of the sealing or packing units, generally designated 26 would be made use of and accordingly there is illustrated a second unit 26 which is connected with the upper end of the housing 10 by means of the collar 27. This second unit comprises a short housing section 10' which is of the same interior diameter as the housing 10 and which is externally threaded at its lower end as shown for connection with the collar 27. At its upper end it is also externally threaded as indicated at 28 to receive the closure cap 29 by which axial pressure is applied to the packing or gland units and the units are retained in place.

The interior surface of the short housing section 10' is, like the upper end of the housing 10 reamed out to provide the recessed area 22' which encircles the enclosed unit. The units 26 as illustrated in the structure shown in Figures 1 and 2 are of duplicate construction and accordingly the same reference characters will be employed for each.

Each of the units 26 comprises upper and lower metal retaining rings 30 around the outside of each of which is formed a channel 31. These channels 31 receive compressible sealing rings 32 which are mashed flat when the rings 30 are inserted into the housing, as illustrated in Figure 4, the encircling channel 31 being suitably formed to allow for the necessary spreading of the ring, the outside diameter of the ring being only slightly less than the inside diameter of the housing whereby a relatively close or tight fit is obtained.

A pair of rings 30 forms a part of each bushing or packing unit and the opposing faces of the rings 30 each has formed therein an annular groove 33.

Interposed between the grooved faces of a pair of rings 30 is readily deformable rubber sleeve 34, each end of which has a portion thereof pressed into the adjacent groove 33 as indicated at 35' whereby a tight seal is effected between the sleeve and the ring.

The length of the sleeve 34 is approximately the same as that of the adjacent recess 22 of the housing and encircling the sleeve 34 is a thin metal shell 35, the overall diameter of which is approximately the same as that of the rings 30. This shell is provided with numerous openings which openings may be of circular form as indicated at 36 in Figures 5 and 7 or in the form of circumferentially directed slots as indicated at 37 in Figure 6 or any other suitable form of opening may be employed, for the purpose hereinafter described.

The compressible sleeve 34 has an inside diameter to tightly enclose the polish rod 19 or shaft or whatever mechanical element it is intended to pack or seal off and it is split along one side in a suitable manner to form a tight joint between the opposing edges as for example, as shown in Figure 2, in a manner to form a tongue and groove joint 38 or, as shown in Figure 9 to form a V-channel and V-rib as indicated at 39. This sleeve in any of the embodiments of the invention may, if desired, be formed in two parts or it may be used as a complete unsplit sleeve if desired although splitting is preferable because of the facility with which its application to the shaft or rod may be effected, as will be readily obvious.

The encircling shell for the compressible sleeve 34 is likewise formed in at least two parts as are the rings 30 also, as shown in Figure 5. Thus the assemblage of the parts around the rod or shaft may be easily effected without withdrawing the rod from the casing.

The compressible sleeve 34 has imbedded therein a number of metallic elements 40 which, by means of fluid pressure introduced into the area 22 or 22' encircling the unit, are forced into contact with the surface of the shaft or rod 19 and furnish a firm bearing for the rod and also keep the surface of the rod or shaft smooth and polished so that the maximum sealing effect of the compressible sleeve body 34 against the surface of the shaft or rod may be obtained.

The imbedded bodies 40 may be of wood, metal or any other suitable material, soft lead bodies having been found highly satisfactory due to the ease with which they wear away when brought into contact with a scored shaft or rod, whereby such scored shaft quickly becomes resurfaced so that the maximum sealing action may be obtained, after which the metal bodies wear less rapidly but maintain the surface smooth and polished.

One of such suitable metals for use as the embedded bodies 40 or the other bodies hereinafter particularly described, is lead.

In the form of the invention illustrated in Figures 1 and 2 the embedded bodies are shown as being in the form of tapered plugs 40a. These plugs are arranged to extend radially and are preferably distributed in staggered rows around the body 34 so as to obtain complete coverage of the surface of the shaft or polish rod. The plugs are also of a length substantially equal to the thickness of the body 34 as shown so that the smaller inner ends thereof will have contact with the shaft or polish rod while the outer ends will bear against the inner surface of the enclosing shell 35.

In Figure 8 a modified form of the embedded body 40 is shown in the shape of headed rivets 40b. These rivets have the long tapering bodies which at their smaller ends contact the surface of the shaft or polish rod like the plugs 40a while at the outer ends they have a relatively large head a which is buried in the surface of the body 34 but exposed for contact with the inner side of the encasing shell 35.

In Figure 10 the embedded bodies are shown as being in the form of pellets 40c. Such pellets are embedded in the inner surface of the compressible body 34 so that a small part of each will be exposed for contact with the polish rod or shaft as will be readily apparent.

From the foregoing it will be evident that when fluid under pressure is introduced through the nipples 24—24' into the chambers 22—22' of the housing sections such fluid will pass through the apertures of the shell enclosing the yieldable or compressible body 34 and press such body firmly against the enclosed shaft or polish rod so as to tightly seal the joint between the packing body and the shaft against the passage of fluid therebetween. At the same time the embedded bodies 40 will be pressed against the shaft or polish rod and provide a bearing surface for the shaft or rod as hereinbefore described. If it becomes necessary to remove either or both of the units 26 this may be done without losing the pressure in the casing by compressing the sealing unit 13 whereby to hold the pressure while the bearing or bushing units are being replaced.

In actual practice it has been found that a bushing or packing gland constructed in accordance with the present invention not only effectively seals a polish rod or a pump shaft efficiently and has a long life but that in addition where such unit has been installed on a shaft or polish rod which has previously had other types of bushings therearound which have caused deep scoring of the shaft or rod, such score marks have been filled up and smoothed out by the inserted bodies when formed of lead or other suitable relatively soft metal so that the shaft while operating has been rebuilt and restored to its former good condition thus making it possible for the yieldable portion of the packing to function with maximum efficiency.

We claim:

In a packing unit for a well pump rod, including a well casing, a pair of spaced annular metal members, each having a peripheral groove and an annular groove in its inner face, a compressible sealing ring seated in each of the said peripheral grooves, a cylindrical annular body of a resilient material interposed between said members, annular portions at each end of said body engaged in said annular grooves, radially disposed, inwardly tapered, metal elements inserted in spaced staggered relation about and through said body, and a perforated metal shell encircling said body with its ends abutted against the inner faces of said members, said shell having an exterior circumference equal to that of said members, said metal elements having their outer ends contacting the inner surface of said shell and their inner ends the surface of the pump rod, when the unit is engaged on the pump rod and inserted inwardly of an end of the well casing.

LAWRENCE B. COLLINS.
CLINTON A. LANGSTAFF.

References Cited in the file of this patent

UNITED STATES PATENTS

| Number | Name | Date |
| --- | --- | --- |
| 556,600 | Walker | Mar. 17, 1896 |
| 1,209,740 | Mastin | Dec. 26, 1916 |
| 1,586,923 | Townsend | June 1, 1926 |
| 1,603,206 | Hull | Oct. 12, 1926 |
| 1,902,906 | Seamark | Mar. 28, 1933 |
| 2,035,925 | Seamark | Mar. 31, 1936 |
| 2,192,805 | Seamark | Mar. 5, 1940 |
| 2,258,887 | Fortune | Oct. 14, 1941 |

FOREIGN PATENTS

| Number | Country | Date |
| --- | --- | --- |
| 16,300 | Great Britain | of 1884 |